US012685960B2

(12) United States Patent
Christensen

(10) Patent No.: US 12,685,960 B2
(45) Date of Patent: Jul. 21, 2026

(54) METHOD AND ARRANGEMENT FOR CAPTURING CO₂

(71) Applicant: GreenCap Solutions AS, Sandnes (NO)

(72) Inventor: Tor Christensen, Sandefjord (NO)

(73) Assignee: GREENCAP SOLUTIONS AS, Sandnes (NO)

( * ) Notice: Subject to any disclaimer, the term of this patent is extended or adjusted under 35 U.S.C. 154(b) by 730 days.

(21) Appl. No.: 17/917,536

(22) PCT Filed: Apr. 7, 2021

(86) PCT No.: PCT/NO2021/050095
§ 371 (c)(1),
(2) Date: Oct. 6, 2022

(87) PCT Pub. No.: WO2021/206564
PCT Pub. Date: Oct. 14, 2021

(65) Prior Publication Data
US 2023/0137348 A1     May 4, 2023

(30) Foreign Application Priority Data
Apr. 7, 2020    (NO) .................................... 20200431

(51) Int. Cl.
B01D 53/04 (2006.01)
B01D 53/06 (2006.01)
(Continued)

(52) U.S. Cl.
CPC ..... B01D 53/0438 (2013.01); B01D 53/0446 (2013.01); B01D 53/0462 (2013.01);
(Continued)

(58) Field of Classification Search
CPC ........... B01D 53/0438; B01D 53/0446; B01D 53/0462; B01D 53/06; B01D 53/261;
(Continued)

(56) References Cited

U.S. PATENT DOCUMENTS 4,472,178 A * 9/1984 Kumar ............... B01D 53/0462
95/99
4,536,197 A 8/1985 Cook
(Continued)

FOREIGN PATENT DOCUMENTS

CA        3004186 A1    9/2017
CA        3074251 A1    3/2019
(Continued)

OTHER PUBLICATIONS

Norwegian Search Report issued in corresponding NO Application No. 20200431, dated Dec. 21, 2020, pp. 1-2.
(Continued)

*Primary Examiner* — In Suk C Bullock
(74) *Attorney, Agent, or Firm* — Robinson & Cole LLP

(57) ABSTRACT

A system for capturing CO₂ from gases, a pre-cooled stream of the gases is conducted through a bed of CO₂ adsorbent in a first direction capturing CO₂ from the gases in the CO₂ adsorbent bed, a stream of warm heating gas is conducted from a heat storage unit to said CO₂ adsorbent bed in a second direction opposite the first direction transferring stored heat from the heat recovery unit to the adsorbent bed, while simultaneously transferring coldness from the adsorbent bed to the heat storage, the heating gas is conducted through the adsorbent bed in a closed loop desorbing CO₂ from the adsorbent bed, the desorbed CO₂ is extracted a stream of cooling gas is conducted through the heat storage unit and the CO₂ adsorbent bed in the first direction transferring low-temperature heat to the adsorbent bed and high-temperature heat from the adsorption bed to the heat storage unit.

13 Claims, 7 Drawing Sheets

(51) Int. Cl.
    *B01D 53/26*       (2006.01)
    *B01D 53/02*       (2006.01)

(52) U.S. Cl.
    CPC ........... *B01D 53/06* (2013.01); *B01D 53/261*
          (2013.01); *B01D 53/02* (2013.01); *B01D*
          *2253/108* (2013.01); *B01D 2257/504*
          (2013.01); *B01D 2257/80* (2013.01); *B01D*
          *2258/05* (2013.01); *B01D 2259/655* (2013.01)

(58) Field of Classification Search
    CPC .............. B01D 53/02; B01D 2253/108; B01D
          2257/504; B01D 2257/80; B01D 2258/05;
          B01D 2259/655; B01D 2258/0283; B01D
          2258/06; B01D 53/14; Y02C 20/40; Y02P
          60/20; F24F 3/14
    See application file for complete search history.

(56)              References Cited

U.S. PATENT DOCUMENTS 4,786,294 A  *  11/1988  Jonqueres ............. B64D 13/08
                                          96/111
5,659,974 A  *  8/1997  Graeff .................. B01J 20/3408
                                          34/507
8,156,725 B2  *  4/2012  Littau ....................... F02C 6/16
                                          60/764
2012/0204717 A1   8/2012  Dinnage et al.

FOREIGN PATENT DOCUMENTS

| | | | |
|---|---|---|---|
| CA | 3098613 | A1 | 12/2019 |
| JP | H09122432 | A | 5/1997 |
| WO | 2018034570 | A1 | 2/2018 |
| WO | 2019238488 | A1 | 12/2019 |

OTHER PUBLICATIONS

International Search Report issued in corresponding PCT Application No. PCT/NO2021/050095, date mailed Jul. 15, 2021, pp. 1-2.
Examination Report issued in corresponding CA Application No. 3,173,632, dated Jan. 8, 2024, pp. 1-5.
Haugstad, Tormod "Higher yields in greenhouses with $CO_2$ capture" TU article, Jan. 21, 2020, pp. 1-6.

* cited by examiner

METHOD AND ARRANGEMENT FOR CAPTURING CO$_2$

CROSS-REFERENCE TO RELATED APPLICATIONS

The instant application is a U.S. National Stage application of and claims priority to PCT/NO2021/050095, filed on Apr. 7, 2021, which is a PCT application of and claims priority to NO Application No. 20200431, filed on Apr. 7, 2020, now NO U.S. Pat. No. 346,496 B1, granted Sep. 5, 2022, the subject matter of both aforementioned applications is hereby incorporated by reference in their entireties.

TECHNICAL FIELD

The present invention relates to a method for the capture and subsequent storage of CO$_2$ from a CO$_2$ source ranging from sources with extremely low concentrations such as ambient air, via sources with higher concentrations such as air from vegetable storage spaces to sources with relatively high concentrations such as flue gas from combustion processes. The product contains up to more than 90% CO$_2$, and no use of chemicals in any form ensures safety. Energy consumption is minimized by means disclosed here. More specifically, the present invention relates to the enhancement of a clean adsorption method and process for CO$_2$ capture, by maximization of the adsorbent CO$_2$ storage capacity combined with storage and re-use of heat required in the process, providing energy savings and thus extending the range of useful applications.

BACKGROUND ART

An earlier invention, WO2018/034570, presented a system for closed or semi-closed greenhouses. The closing of the greenhouse is accomplished by extracting air at a high rate from the closed greenhouse, dehumidifying it, adjusting the temperature, adding supplementary CO$_2$ captured from the outside air, and subsequently returning this CO$_2$ enriched air to the greenhouse. This stabilizes the greenhouse temperature and humidity and eliminates possibilities for CO$_2$ emissions.

Plants growing in closed or confined areas such as greenhouses will consume CO$_2$ and thus deplete the CO$_2$ in the air. Therefore, most greenhouses have an artificial supply of CO$_2$, such as from a tank with liquid CO$_2$. However, on warm days or with powerful artificial light in the greenhouse, the opening of hatches may be required to reduce the temperature. Air from the greenhouse then flows via the hatches to the outside atmosphere, and added CO$_2$, which is mixed with the greenhouse air, escapes via the hatches along with the escaping air. Up to 75% of added CO$_2$ may be lost as result of this. Therefore, to minimize losses, the CO$_2$ concentration in the air tends to be much lower than the optimum concentration, limiting the CO$_2$ usage and emission to acceptable levels. Furthermore, air inside greenhouses tends to become very humid as most of the irrigation water is transpired and thus humidifies the air. This also forces the opening of the hatches in many cases.

Open greenhouses tend to get too high humidity. Plant transpiration in greenhouses increases the relative humidity in the local air. About 90% of the humidity taken up by plants is used for transpiration while 10% is used for growth. The transpiration cools the plant to 2° C. or more below the ambient temperature. The rate of transpiration is a function of, among other factors, the radiative heat input and the air relative humidity. High relative humidity, near water vapour saturation in the local air, reduces transpiration. If the temperature then drops, water may precipitate on plant leaves and elsewhere. This increases the risk of fungal diseases. Low relative humidity, such as below 50% in combination with high temperature, may result in excessive transpiration rates. The plant may then start to close the stomata openings, through which transpiration occurs, to reduce transpiration. However, CO$_2$ uptake also occurs through the stomata openings, so this may restrict plant growth. It is important to maintain the local air relative humidity at acceptable if not optimum levels.

Plant growth rate depends heavily on light including solar radiation or artificial lights. Solar radiation up to at least 600 W/m$^2$ benefits the plants. Artificial light provides about 250 to 300 W/m$^2$ and is used whenever the solar radiation is insufficient. However, both sources of light also provide heat and thus affect the greenhouse temperature. The optimum temperature depends on plant species and time of day. Day temperature of 20 to 25° C. is suitable for most plants. Optimum night temperatures may be in the range from 15 to 18° C. Typically, the heat input is too high during sunny days and as a result, greenhouse hatches are opened. This helps reduce the temperature and humidity.

The opening of the hatches also reduces the concentration of CO$_2$ and this may hamper plant growth rate. The depletion may happen very quickly, within minutes. Greenhouses with artificial CO$_2$ addition, such as from liquid CO$_2$ tanks, typically operate with CO$_2$ concentrations in the range from 600 to 800 ppm. With open hatches this drops to about 400 ppm. Up to three quarters of all CO$_2$ artificially injected into the greenhouse is emitted. This is costly and reduces plant growth rates. It limits the economic optimum CO$_2$ concentration in the greenhouse; without such emissions the optimum CO$_2$ concentration might have been much higher such as 1200 ppm.

The earlier invention, WO2018/034570, solves these issues. Further work with this technology has uncovered new areas where the technology disclosed in can provide great benefits. One example is vegetable storage facilities, where the air tends to become too CO$_2$ rich, such as for example 10 000 ppm, caused by slow vegetable degradation. The CO$_2$ capture technology, WO2018/034570, could solve this problem by closing the storage facility and capturing excess CO$_2$. The question if the capture system could capture CO$_2$ from flue gas, typically containing 40 000 ppm CO$_2$, has also been raised.

Among several such other possibilities, the direct capture of CO$_2$ from air, abbreviated DAC (Direct Air Capture) has recently gained significant interest as a means to limit climate change. Such facilities could provide negative emissions, and this could be assigned to positive emissions to annul these.

Based on the above, there is a need for a CO$_2$ capture system that can capture CO$_2$ from air, from intermediate concentration CO$_2$ sources, and from flue gas without major modifications. The energy consumption should be minimized, the CO$_2$ captured must be available at randomly fluctuating rates, and the CO$_2$ must be clean and suitable for closed spaces where people work.

CO$_2$ capture systems, from sources where the CO$_2$ is at least partly mixed with components from air and are not pressurized, are usually tailor made to the CO$_2$ source. As an example, CO$_2$ from flue gas is typically captured by adsorption using a reactive amine solution. The main issue with this is amine degradation in the presence of oxygen, forming carcinogenic compounds such as nitrosamines.

Currently there are no known $CO_2$ capture systems suitable for $CO_2$ sources with intermediate $CO_2$ concentrations such as 10 000 ppm.

The capture of $CO_2$ from air is under development by some players. One example is the contacting of aqueous potassium hydroxide with air. The hydroxide reacts with $CO_2$ to form potassium carbonate. A major challenge with this is the complexity and energy needed to regenerate the potassium hydroxide solution. Competing adsorption systems, under development to reduce energy requirements, typically use quite complex chemical solutions. Commercializing such systems typically takes a long time. Alternatives include adsorption systems WO 2013075981 A3 describes a method for extracting $CO_2$ from air by adsorption on a solid adsorbent. The solid sorbent is functionalized using amine compounds that react with $CO_2$. These chemicals enhance the adsorption capacity and reduce adsorbent sensitivity to humidity. However, during regeneration of the adsorbent, the amine compounds are exposed to hot air with high concentrations of oxygen, causing potential degradation to toxic and possibly carcinogenic products. $CO_2$ from such sources can therefore not be used in the enclosed space of a greenhouse. Performance during long term operation is uncertain, and functionalized solid sorbents may not be commercially available. Among non-functionalized adsorbents that are available commercially zeolites, as used in WO2018/034570 are among the most promising Zeolites have some very significant advantages. $CO_2$ capture is extremely fast even from dilute sources such as air. Zeolites consist of pure aluminium and silicon oxides. These are inert and safe compounds, much as natural rocks. Zeolites are commercially available from numerous manufacturers and proven. They are suitable for DAC and also $CO_2$ sources with higher $CO_2$ concentrations than air.

One disadvantage with zeolites is the affinity for $H_2O$. $H_2O$ is preferentially adsorbed. If the zeolite contains more than 2 to 4 weight % $H_2O$, the capacity to adsorb $CO_2$ is reduced. However, if there is moisture in the air or gas containing $CO_2$, this moisture will be adsorbed quickly at the zeolite bed inlet. Further into the zeolite bed $CO_2$ may still be adsorbed. The overall effect is a slightly reduced capacity to store $CO_2$, while the ability to quickly adsorb $CO_2$ further into the zeolite bed is less affected.

From WO 2019/238488 and U.S. Pat. No. 4,536,197 there are known methods for capturing $CO_2$ in $CO_2$ adsorbent beds involving the use of heat recovery units for transferring heat to and from said beds.

SUMMARY OF THE INVENTION

It is an object of the present invention is to provide a method and an arrangement for efficient capture of $CO_2$, temporarily store the captured $CO_2$ and release the $CO_2$ as nearly 100% $CO_2$ following the adsorption sequence. The invention shall not introduce any new contaminants in the produced $CO_2$ or in the exhaust air. An additional object is to reduce energy consumption, in particular high value energy such as electric or high temperature (above 80 to 100° C.) to an absolute minimum. Furthermore, the adsorbent shall be used as efficiently as possible, requiring the least amount for a pre-defined $CO_2$ capture capacity. Beyond this, the latest commercially available technologies, including air handling which is developing rapidly to reduce energy consumption, shall be utilized to the extent possible. The invention shall have the capability to work with varying $CO_2$ concentrations in the incoming gas, from as low as 50 ppm (which may be desirable in greenhouses during the night) via 400 ppm as in ambient air and 10 000 ppm as in vegetable storage facilities, to 40 000 ppm as in flue gas from combustion engines.

These objects are achieved in a method and arrangement as defined in the claims.

BRIEF DESCRIPTION OF THE DRAWINGS

The invention will now be described in detail in reference to the appended drawings, in which.

DETAILED DESCRIPTION OF THE INVENTION

In the present description and claims the terms "humidity" and "absolute humidity" are used as a measure of the true water vapour content of air (g/m3). The term "relative humidity" of an air-water vapour mixture is used as a measure of the ratio of the actual partial pressure of water vapour in the air to the partial pressure of water vapour in the air if the air had been saturated at the temperature in question. The term "$CO_2$ concentration" is a measure of the number of molecules of $CO_2$ in the air relative to the total number of gas molecules in the air. It is measured in ppm or parts per million.

The pressure is herein given in the unit "bara" is "bar absolute". Accordingly, 1.013 bara is the normal atmospheric pressure at sea level. In SI units, 1 bar corresponds to 100 kPa.

The expression "ambient temperature" as used herein may differ with the climate for operation of a closed or semi-closed system served by a process according to the present invention. Normally, the ambient temperature is from about 0 to 40 C, but the ambient temperature may also be from sub-zero levels to somewhat higher than 40° C., such as 50 C.

Figure 1:
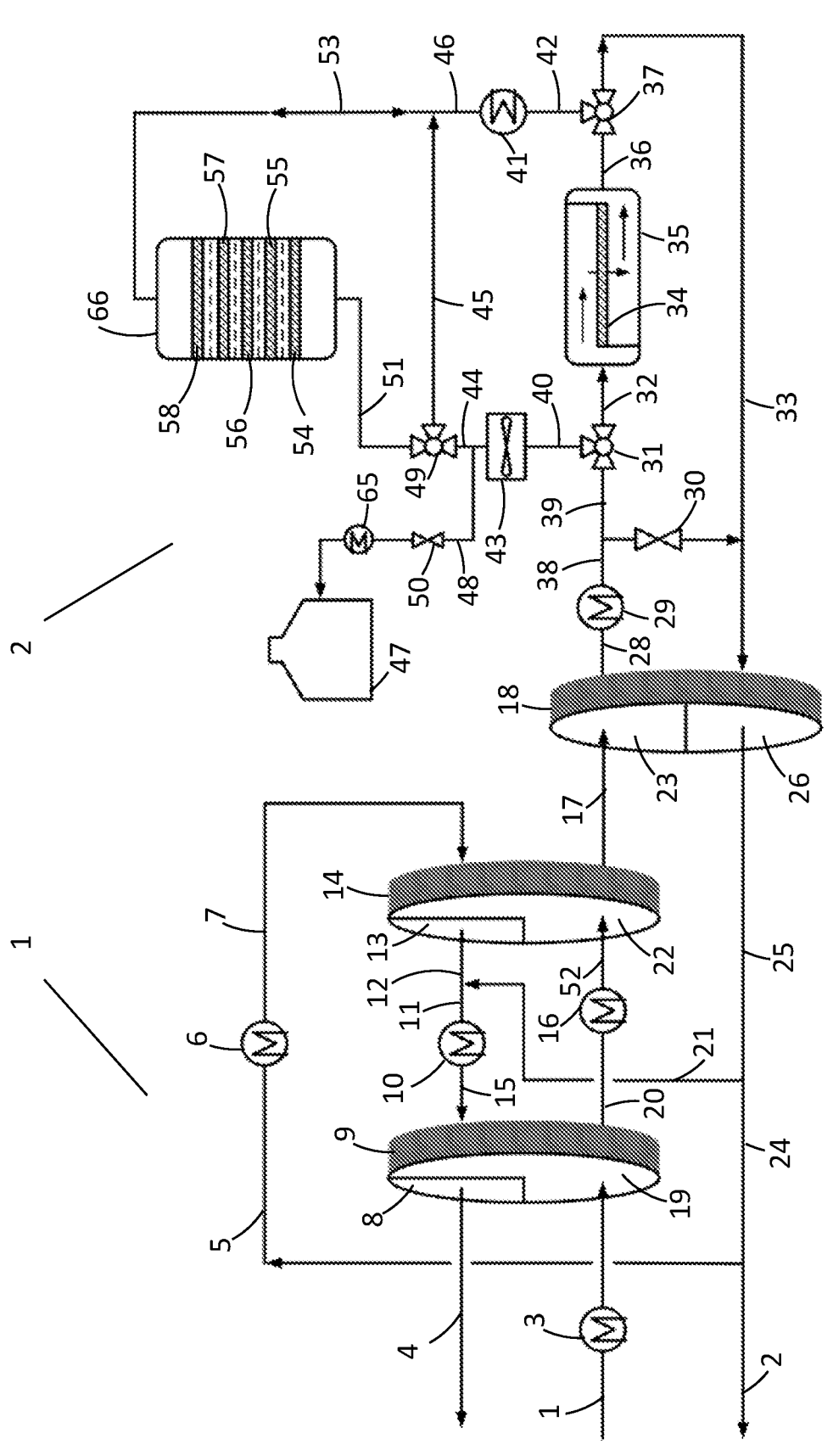
FIG. 1 is a schematic diagram showing one implementation of the invention, with air pre-treatment, $CO_2$ adsorption and energy conservation measures.

FIG. 1 is a principle overall sketch of a system according to a preferred embodiment of the present invention. Part 1 is a process for air cooling and de-humidification and re-heating after $CO_2$ capture, comprising two desiccant wheels and a heat exchanger illustrated as a heat exchange wheel. The desiccant wheels are for air de-humidification. The heat exchange wheel is for air re-heating after $CO_2$ capture, preserving energy. Part 2 is the $CO_2$ capture system with zeolite bed, $CO_2$ desorption gas circulation system, heat storage and $CO_2$ storage.

Part 1, air cooling and de-humidification with subsequent re-heating, comprises an air inlet conduit 1 where ambient air enters the process driven by a not shown fan. This air may be pre-cooled in a cooler 3 before proceeding to a first desiccant wheel 9. The desiccant wheel comprises a rotating cylinder, typically 10 to 30 cm thick, where the air passes over a water adsorbent such as silica gel. The cylinder has two sections 19 and 8, the first used for air dehydration and the second used for adsorbent regeneration. The sections are shown as 270° for dehydration and 90° for regeneration, but this is for illustration purposes and may vary depending on system design. As an example, 180° for dehydration and 180° for regeneration may also be used. In the section 19 the air gets in contact with or in close proximity to the adsorbent. The adsorbent physically adsorbs humidity according to known equilibria between amount of humidity adsorbed and partial pressure of humidity in the air. Typically, and depending on air temperature and relative humidity, about two thirds of the moisture in the air will be adsorbed in the desiccant wheel 9, section 19. The air pressure drop through the desiccant wheel is very low, in the order of 100 Pa. The slow rotation of the wheel, perhaps 10 revolutions per hour, continually moves the humid adsorbent exposed to air from the moisture adsorption section 19 to the regeneration section 8 and after regeneration back to the section 19.

Downstream the desiccant wheel 9 the air flows in a conduit 20 via a cooler 16 and a conduit 52 to a second desiccant wheel 14. Similar to the desiccant wheel 9, this cylinder may be 10 to 30 cm thick and there is a 270° moisture adsorption section 22 and 90° regeneration or desorption section 13. Silica gel is typically used as desiccant. In the section 22 most of the humidity in the air from the desiccant wheel 9 is removed. The partial pressure of $H_2O$ in the air exiting the wheel, conduit 17 leading to the process part 2, shall be such that no water precipitation or ice forms in downstream low temperature processes. Typically, this means water dew point in the range −30 to −60° C., preferably about −50° C.

Dry air returning from the process part 2, conduit 25, is slightly colder than the air going to the process part 2, the conduit 17. This air flows via a small side draw, a conduit 21, typically zero or a few percent of the air in the conduit 25, and then in a conduit 24 to a second side draw, a conduit 5. Air flow in the conduit 5 may be from about one third to two thirds or more of the air in the conduit 25. This dry air flows to a heater 6 where it is heated to typically 50 to 100° C., with preferred temperature in the range 60 to 80° C. After heating, this air flows in a conduit 7 to the regeneration section 13 of desiccant wheel 14. This desorbs water from the $H_2O$ adsorbent and thus shifts the equilibrium in the desiccant wheel, section 13, towards lower amounts of $H_2O$ in the adsorbent and more humidity in the air. The remaining amount of humidity in the adsorbent is such that, as the adsorbent moves with the rotating wheel into the water adsorption section 22, the adsorbent is capable of reducing the $H_2O$ dew point in the conduit 17 to desired values, about −30 to −60° C. Energy for $H_2O$ removal in the section 13, essentially vaporization energy for the $H_2O$ removed from the adsorbent, is supplied as sensible heat in the air from the heater 6. As $H_2O$ is removed from the adsorbent, the air temperature drops by about 25° C. and exits the desiccant wheel, a conduit 12, at roughly 35 to 55° C.

Downstream the desiccant wheel 14 the regeneration air flows in the conduit 12 to a point of mixing with small amounts of extra air from the conduit 21. This reduces the relative humidity of the resulting air mixture, which next flows in a conduit 11 to a heater 10. In the heater 10 the air is trim heated, as required, to desired temperature which, similar to air in the conduit 12, is in the range 35 to 55° C. or higher such as 60 to 100° C.

After the trim heating the air flows in a conduit 15 to the adsorbent regeneration section 8 of desiccant wheel 9. In the regeneration section $H_2O$ is removed from the desiccant. This shifts the equilibrium in the desiccant wheel, section 13, towards lower amounts of $H_2O$ in the adsorbent and more humidity in the air. The shift progresses to a level sufficient for required air dehydration as the desiccant moves with the revolving wheel into the adsorption section 19. Similar to the desiccant wheel 14, the regeneration energy in desiccant wheel 9 is supplied as sensible heat in regeneration air from the conduit 15. The amount of energy required is determined by the vaporization energy of the $H_2O$ removed from the adsorbent.

Moist regeneration air, at a temperature slightly higher than the temperature of the ambient air, is returned to the atmosphere. Excess dry air from the process part 2, a conduit 2, is also returned to the atmosphere or may alternatively be utilized in a not shown vaporization chilling unit for the supply of low temperature coolant to for example coolers 3 or 16.

FIG. 1 part 2 shows a process for the reception of dehydrated air from part 1, cooling of this air, adsorption and desorption of $CO_2$, re-heat of the dehydrated air and return of this air to the process part 1. Air from the conduit 17 is cooled in a heat exchange wheel 18, section 23. The air flows through passages in the wheel and gets in close contact with cold substance, such as a metal, in these openings. This cools the air and at the same time heats the wheel heat storage substance. The wheel rotates slowly, thus moving heated heat storage substance from partition 23 to partition 26 of the wheel, where the wheel heat storage material is re-cooled by cold air from a conduit 33. In this process, the air from the conduit 33 is heated. It exits the heat exchange wheel 18, section 26, in the conduit 25. People skilled in the art will understand that the heat exchange wheel 18 can be replaced by an air-air heat exchanger.

Cooled air exits the heat exchange wheel 18 in a conduit 28. The temperature is typically in the range −25 to −45° C. Next, the air is trim cooled in a heat exchanger 29 by heat exchange with a coolant provided by a not shown heat pump. After trim cooling, in a conduit 38, the air is about 2 to 5° C. colder than in the conduit 28. This air may bypass downstream equipment via a valve 30, enabling the continued operation of the upstream air dehydration and cooling process whenever the downstream $CO_2$ capture process does not need air, such as during $CO_2$ desorption.

The process downstream of the conduit 38 has four operating modes. These are $CO_2$ adsorption at low temperature in an adsorbent bed 34 located in a container 35, heating of the adsorbent bed, desorption of $CO_2$ from the adsorbent bed and re-cooling of the adsorbent bed before the cycle is repeated.

Figure 2:
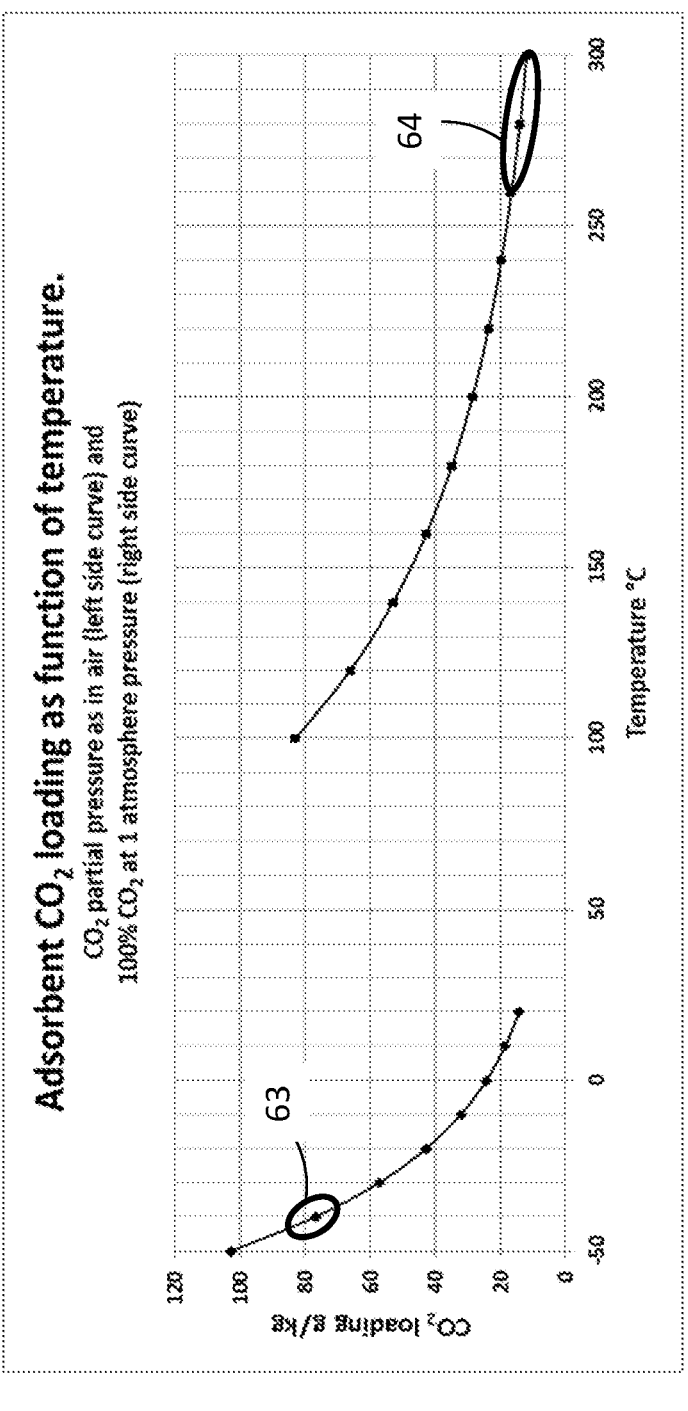
FIG. 2 is a plot of adsorbent performance when capturing $CO_2$ from air and desorbing at $CO_2$ partial pressure near atmospheric pressure.
Figure 3:
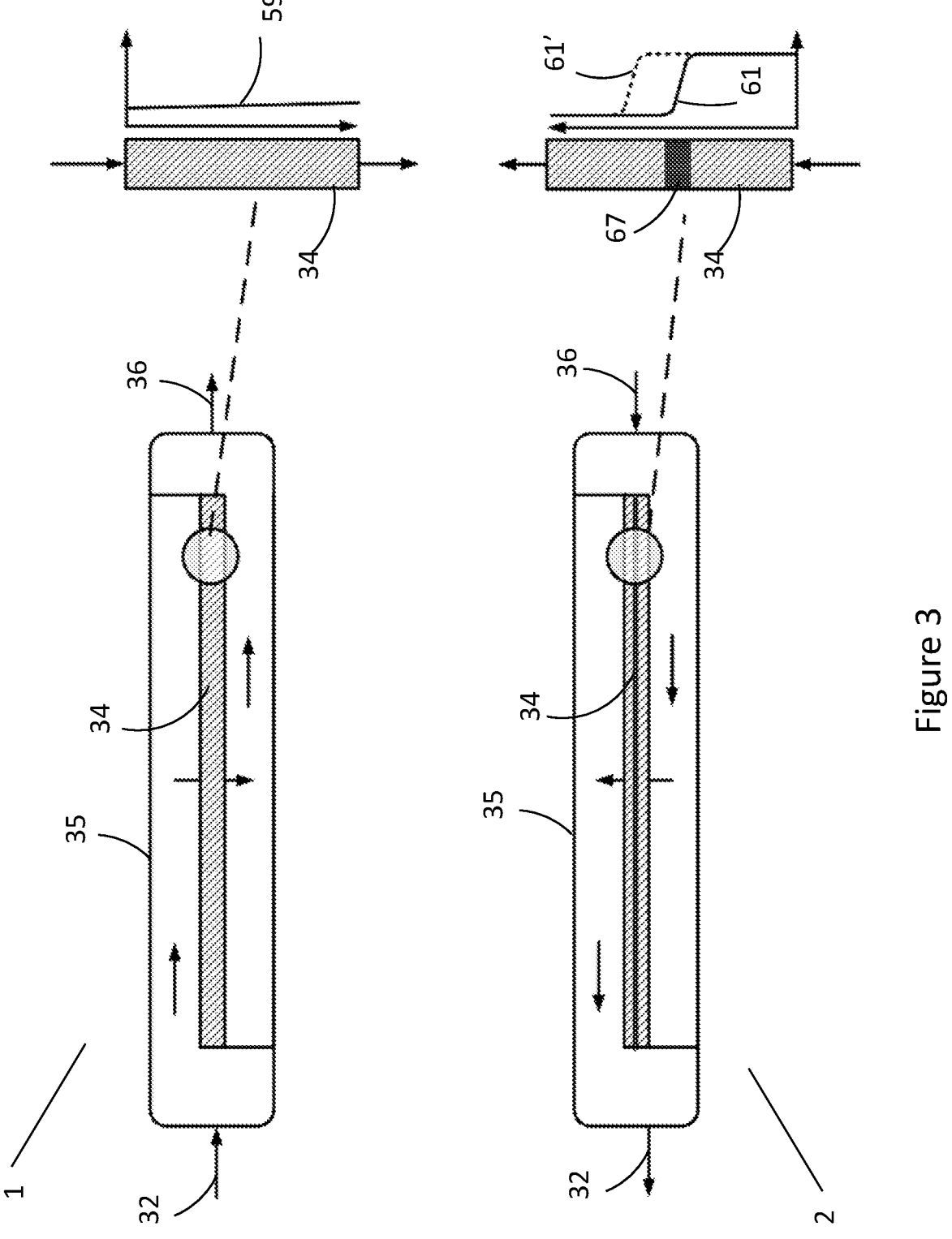
FIG. 3 is a schematic diagram of adsorbent containment with flow direction and temperature profiles during $CO_2$ adsorption and during adsorbent heating.

During $CO_2$ adsorption cold, dehydrated air flows via a conduit 39, a valve 31 and a conduit 32 to the adsorbent bed 34. FIG. 2 shows typical range for low temperature and high adsorbent loading operation, 63, of this operation. The adsorbent bed adsorbs virtually all $CO_2$ from the air. The duration of the adsorption process may be from less than one and up to several hours. FIG. 3, part 1, graph 59 shows spatial variation in the air temperature within the adsorbent bed during $CO_2$ adsorption. The temperature is low, in the range from −10 to −50° C., and increases slightly, perhaps by roughly 1° C., from the bed inlet to the bed outlet. The air flow, which is large especially when adsorbing $CO_2$ from lean air as opposed to for example flue gas, flows down-wards through the $CO_2$ adsorbent beads. This prevents fluidization of the beads.

$CO_2$ depleted air from the adsorbent bed 34 is directed via the exit conduit 36 and a valve 37 to the return conduit 33.

Figure 5:
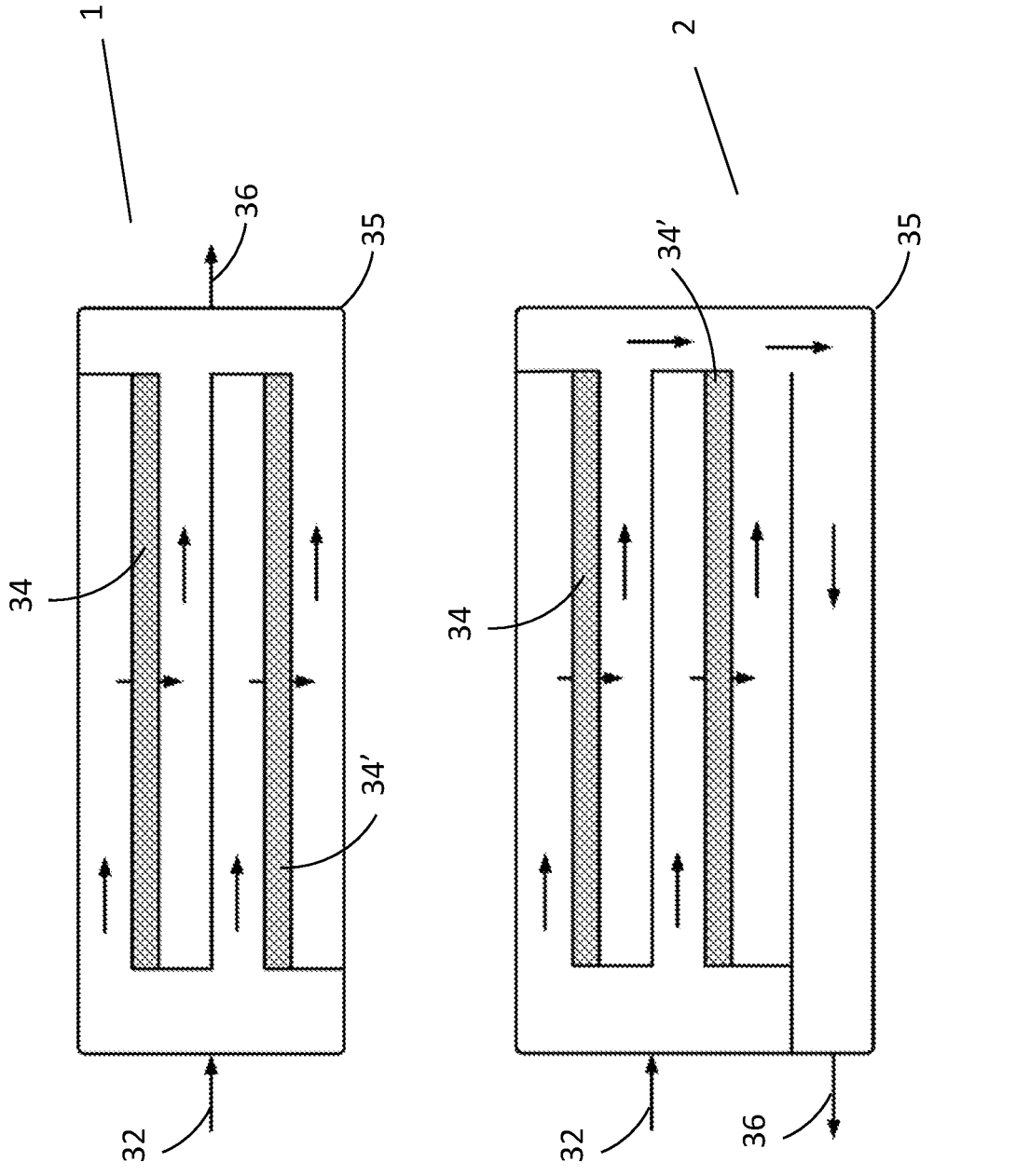
FIG. 5 is a schematic diagram of compact $CO_2$ adsorbent containment systems with adsorbent stacked vertically

FIG. 5, parts 1 and 2 shows compact designs of the adsorbent beds and adsorbent container 35. Air from the conduit 32 flows to two adsorbent beds stacked in a vertical direction, arranged for parallel air flow, such that equal fractions of the total air flows through each bed. An air exit conduit 36 may be on the opposite side of the air inlet flow 32, as shown in FIG. 5 part 1, or, for very compact designs, on the same side as shown in part 2. FIG. 5 shows two adsorbent beds arranged vertically, but larger numbers of vertically stacked beds such as 3, 4, 5 or more is possible.

After completion of the first operation mode, $CO_2$ adsorption, the process switches to the second operating mode. The adsorbent bed is heated to the temperature required for $CO_2$ desorption. FIG. 2 shows the range 64 of preferred new high temperature and low loading area.

The heating is accomplished by gas, a mixture of air and $CO_2$, flowing from the warm side 58 of a combined high and low temperature heat storage system 54, 55, 56, 57 and 58. This gas flows via a conduit 53, a conduit 46 and trim heater 41, a conduit 42, the valve 37 and the conduit 36 to the adsorbent bed 34, thus heating the adsorbent bed. The flow direction through the adsorbent bed is the opposite of the direction used during the first operation mode, adsorption.

When a gas such as air flows through a bed of $CO_2$ adsorbent, comprised of adsorbent beads with diameter typically in the range 4 to 6 mm, the heat transfer area between the beads and the air is very large. The heat is therefore transferred rapidly from the air to the beads. This transfer occurs and is completed in a temperature transition zone within the adsorbent bed. FIG. 3 part 2 illustrates this. A transition zone 67 receives warm air from below. When the warm air encounters colder adsorbent beads, the beads are warmed and the air is cooled. Thus, at the inlet of the transition zone, the adsorbent beads reach nearly the same temperature as the warm incoming air. In the transition zone the air transfers heat to the beads and is cooled in the process. At the end of the transition zone the air has been cooled to nearly the same temperature as the original low bead temperature, and retains this low temperature as it flows through the remaining adsorbent bed. FIG. 3, part 2, graph 61 shows this. Thus, as more heat is supplied with hot incoming air, the transition zone is moving from the adsorbent bed inlet towards the bed outlet, graph 61'. This transition zone movement through the bed may take from minutes up to an hour or more, and the volume of air that has flowed through the adsorbent bed will have been many times larger than the volume of the beads being warmed.

Figure 6:
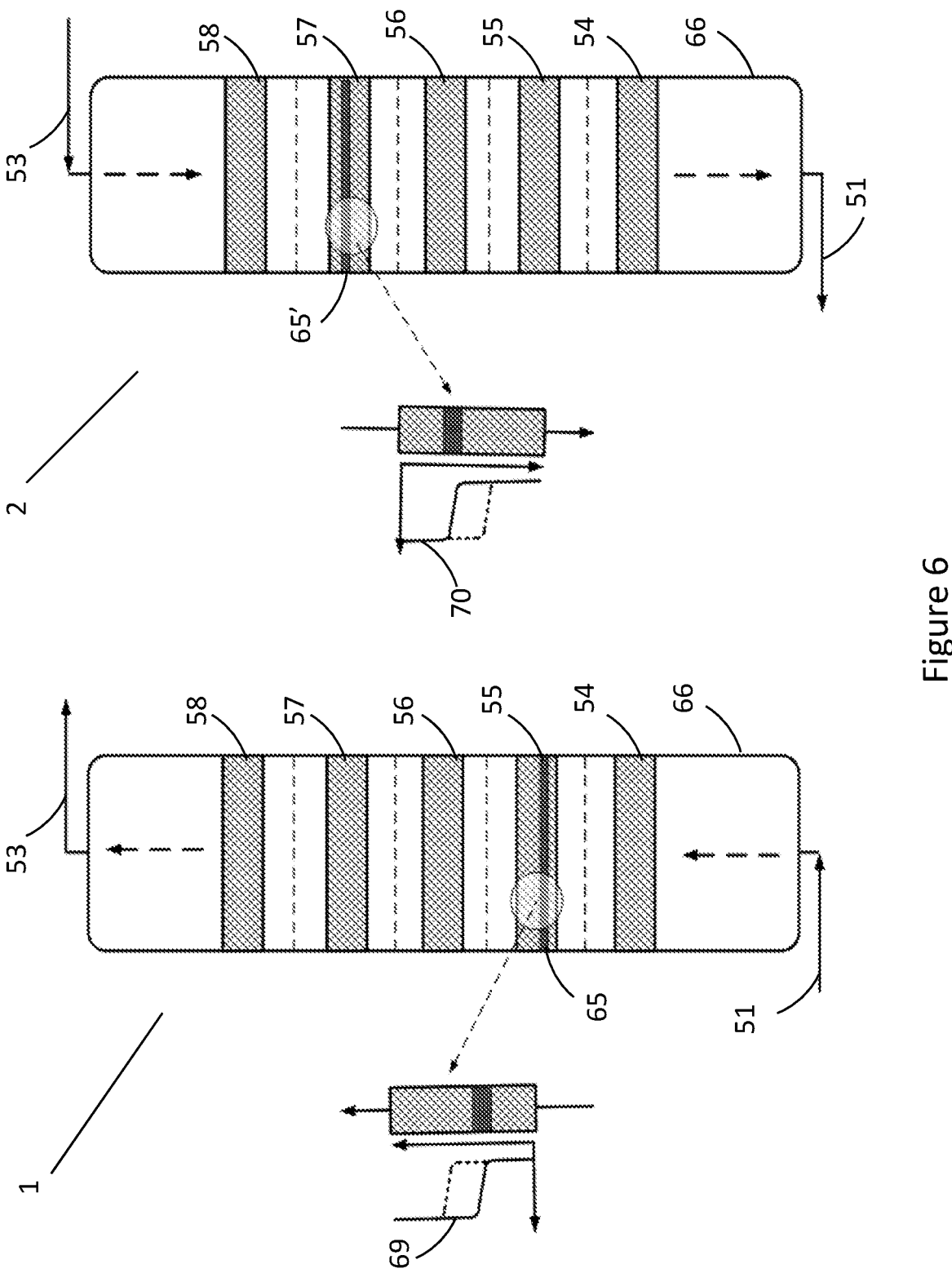
FIG. 6 is a schematic diagram of heat storage with air or $CO_2$ flow directions during storage of coldness and delivery of heat, and during storage of heat and delivery of coldness.

The key phenomenon is that the adsorbent beads are heated to nearly the temperature of the warm incoming air, thus preserving the valuable high temperature heat of the air. The air going out of the adsorbent bed will be at the low temperature originally in the bed, thus preserving the valuable low temperature heat originally in the adsorbent bed, until the transition zone reaches the end of the bed. It is thus possible to store this coldness for later use. As shown in FIG. 6 part 1 this is done in the stacked heat storage beds 54 to 58, located within a container 66. The cold heat transfer gas flows via the conduit 32, the valve 31 now adjusted for the second operating mode, via a fan 43, a conduit 44, through a valve 49 to a conduit 51.

The stacked heat storage bed receives cold air from the conduit 51. The beds contain metal or ceramic heat storage material with large surface area such as beads with diameters 3 to 10 mm. There are several beds, 5 shown in FIGS. 1 and 6, to minimize heat transport from cold end, near the conduit 51 to warm end, near the conduit 53, when heat and coldness are both stored.

The cold air and $CO_2$ from the conduit 51 flows through bed 54, then to the bed 55 which contains an upwards moving temperature transition zone 65, with temperature profile as shown in graph 69. This transition zone could also be in beds 54, 56, 57 or 58 but not at the top end of the bed 58. This depends on the size of the heat storage and the system operation. People skilled in the art will also understand that the exact shape of the transition zone depends on air flow rate end temperature, heat transfer to and from the heat storage medium and the amount and heat capacity of heat storage medium.

Air from the transition zone is warm. As the air flows through beds 56, 57 and 58 it stays warm and thus supplies heat to the $CO_2$ adsorbent bed 34 via the conduits 53 and 46, the trim heater 41, the conduit 42, the valve 37 and the conduit 36. The overall effect of this process is to move valuable coldness from the adsorbent bed 34 to the heat storage 66, while at the same time moving heat from the heat storage 66 to the adsorbent bed 34. This continues until the $CO_2$ adsorbent bed is warm and ready for the third operating mode.

Figure 4:
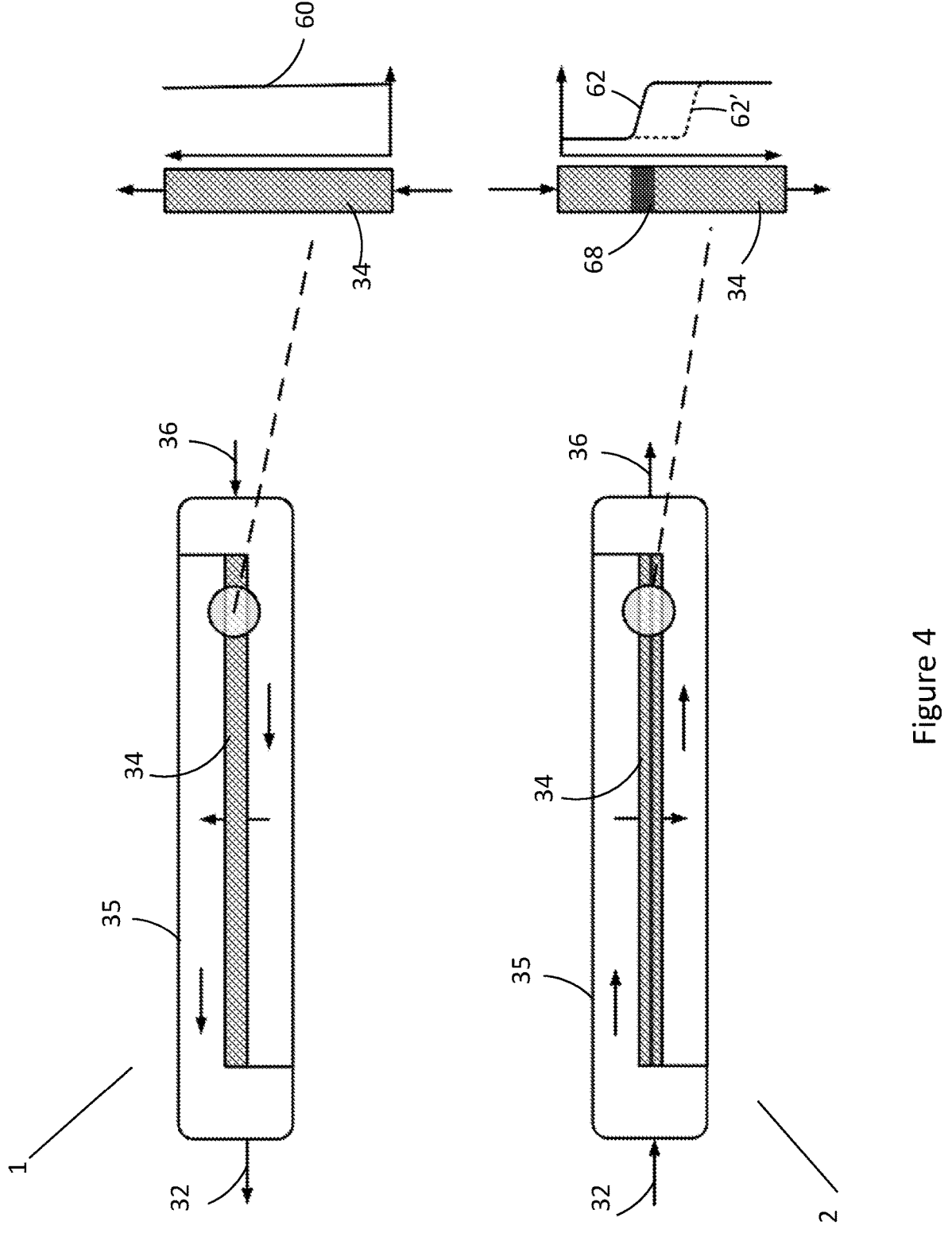
FIG. 4 is a schematic diagram of $CO_2$ containment with flow direction and temperature profiles during $CO_2$ desorption and during adsorbent cooling.

After completion of the second operating mode, $CO_2$ adsorbent heating, the third operating mode, $CO_2$ desorption, starts. Warm air from the adsorbent 34 flows via the conduit 32, in opposite way of the arrow shown in FIG. 1, via the valve 31 to the conduit 40. Similar to the second operating mode, valve 31 allows flow from conduit 32 to conduit 40, but is closed to conduit 39. The gas flows from the conduit 40 via the fan 43 and the conduit 44 to the valve 49. This valve is adjusted such the gas can flow to a conduit 45 but not to the conduit 51. Gas from the conduit 45 is directed via conduit 46 to the trim heater 41. Small amounts of heat are provided in the heater 41 to compensate for $CO_2$ desorption heat requirement, typically around 30 kJ/mole $CO_2$. In addition, any water remaining in air from the adsorbent wheel 14 that has been adsorbed in the adsorbent 34 is removed and requires some extra heat, about 4 kJ/g. The temperature profile within the adsorbent bed 34 during $CO_2$ desorption is indicated in FIG. 4, part 1. The temperature is high and nearly constant especially towards the end of the desorption cycle, as shown in graph 60. $CO_2$ desorption proceeds until the temperature is in the range 260 to 300° C. as indicated in FIG. 2, area 64.

During operating mode three, when $CO_2$ is desorbed, large volumes of $CO_2$ are supplied from the $CO_2$ adsorbent to the gas phase. In order to keep the system pressure constant, and to preserve the $CO_2$ for later use, the produced $CO_2$ is directed via a conduit 48, a valve 50 and a cooler 65 to $CO_2$ storage 47. This storage may preferably be of the inflatable type.

People skilled in the art may notice, from FIG. 2, that some $CO_2$ may be released from the adsorbent bed 34 during the second operating mode as the adsorbent is heated. This $CO_2$ is also directed to the storage 47.

After completion of the third operation mode, $CO_2$ desorption, the process switches to the fourth operating mode, adsorbent bed cooling. The adsorbent bed is cooled to the temperature required for $CO_2$ adsorption. This procedure is somewhat similar to the second mode of operation, adsorbent bed heating, but the gas now flows in the opposite direction. The cooling is accomplished by gas, a mixture of air and $CO_2$, flowing from the cold side 54 of the combined high and low temperature heat storage system 54, 55, 56, 57 and 58. This gas flows via the conduit 51, the valve 49, the conduit 44 and the fan 43, via the conduit 40, the valve 31 and the conduit 32 to the adsorbent bed 34. The flow direction through the adsorbent bed is the same as used during the first operation mode, adsorption. Similar to operating mode 2, instead of gradually cooling the whole adsorbent bed the bed will be cooled to nearly the temperature of the incoming cold gas in initially a heat transfer zone near the gas inlet into the bed.

This temperature transition effect is shown in FIG. 4, part 2, graphs 62 and 62'. Graph 62 shows the temperature transition zone at some time into the heating process, graph 61' at a later time. This transition zone occurs initially at the bed inlet. As cooling progresses, it moves gradually into the bed until it finally reaches the end at the bottom of the bed. As FIG. 4 part 2, graph 62 shows, gas from the $CO_2$ adsorbent transition zone is warm, very near the temperature of the adsorption bed before cooling started. This high temperature is preserved for later bed heating by directing the warm gas via the conduit 36, through the valve 37 in a direction to the conduit 42 and the trim heater 41, via conduits 46 and 53, to the warm storage side of heat storage system 54 to 58.

In a similar manner as in the adsorbent bed 34, this incoming warm air pushes air through the heat storage system. As the air reaches a cold-hot transition zone, shown in FIG. 6 part 2, transition zone 65', it is cooled to nearly the temperature required for the cooling of the adsorbent bed 34. FIG. 6 shows the transition zone in heat storage bed 57 but could typically be in the heat storage beds 56 or, towards the end of the adsorbent cooling operation, bed 55 or some distance into bed 54 but not at the end of this bed. Below the transition zone the air is cold. The cold air flows via the conduit 51, the valve 49, the conduit 44, the fan 43, the conduit 40, the valve 31 and the conduit 32 back to the adsorbent bed 34. This moves the transition zone here further into the bed. Completing of the adsorbent bed cooling is accomplished when the air has done many such circulations between the heat storage beds 54 to 58 and adsorbent bed 34 and thus has carried enough coldness from the beds 54 to 58 to the $CO_2$ adsorption bed 34, moving the transition zone to the end of the bed. Simultaneously, all the high temperature heat from $CO_2$ adsorbent bed 34 is transported to the warm end of heat storage units 54 to 58.

The warm-cold transition zone in the heat storage system has been pushed from the warm end bed 58 towards the cold end bed 54 but not through the cold end bed 54 all the way to the outlet of this unit, the conduit 51. The direction of movement of the warm-cold transition zone is shown in FIG. 6 part 2, transition zone 65' and graph 70.

After completion of the fourth operating mode, the first operating mode can start, repeating the cycle.

Figure 7:
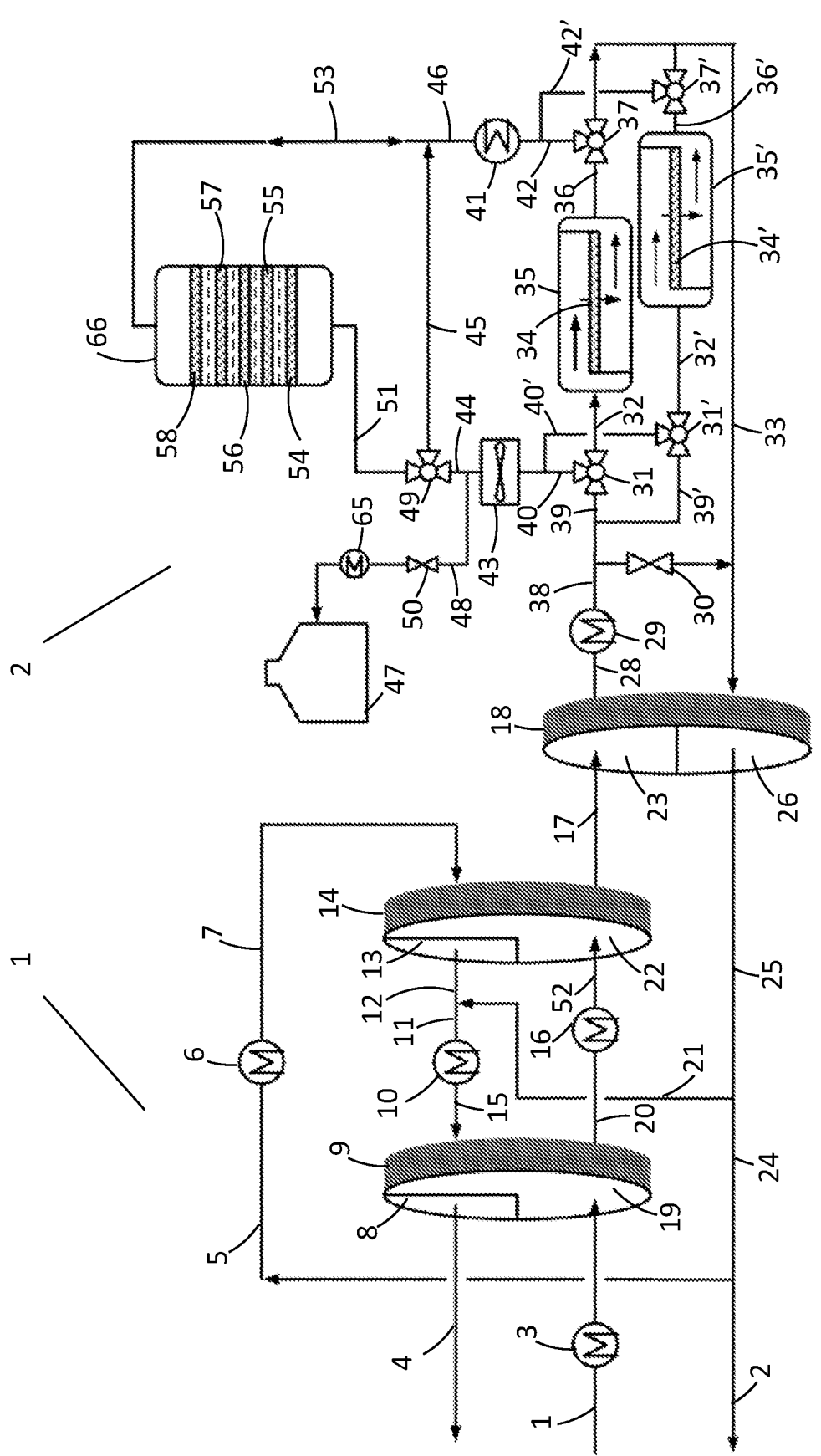
FIG. 7 is a schematic diagram showing one implementation of the invention, with air pre-treatment, dual $CO_2$ adsorption facility and energy conservation measures.

FIG. 7 shows a second embodiment of the invention. A second $CO_2$ adsorption unit 35' is connected in parallel to the first unit 35. The operation of the second unit is similar to the operation of the unit 35. Operation may be by alternating $CO_2$ adsorption between the two units. For example, one of the units, for example the unit 35', is in the first operating mode, receiving cold and dry air through a conduit 39', a valve 31' and a conduit 32'. After adsorption, $CO_2$ and $H_2O$ depleted air is routed via a conduit 36' and a valve 37' to the conduit 33. During this operation, the other unit, 35, goes through operating modes two, three and four. In this way, the cold and dry air supply may operate continuously and may therefore be smaller in order to supply a specified amount of $CO_2$. In addition, in $CO_2$ adsorbent beds the heat storage may be smaller than would be required according to FIG. 1.

Example

This example will follow the four operating modes. As before, these are $CO_2$ adsorption at low temperature in an adsorbent bed 34 located in a container 35, heating of the adsorbent bed, desorption of $CO_2$ from the adsorbent bed and re-cooling of the adsorbent bed before the cycle is repeated. The initial state before the $CO_2$ adsorption starts is the same as the state after the completion of the fourth operating mode. The $CO_2$ adsorbent bed has been cooled and high temperature heat is stored in the heat storage 54 to 58. Furthermore, the $CO_2$ adsorbent contains about 15 g residual $CO_2$ per kg $CO_2$ adsorbent from a previous run. The example refers mainly to the FIG. 1.

It is desirable to produce about 600 kg $CO_2$ corresponding to 80 kg per hour over 7.5 hours. In the first operating mode, $CO_2$ adsorption, 30 kg/s ambient air at 15° C., 95% relative humidity and containing 400 ppm $CO_2$, corresponding to 80 kg $CO_2$ per hour, is forced through the conduit 1 by a not shown fan. There is no cooling in the cooler 3 and the total $H_2O$ flow in this stream is about 1334 kg/h. In the desiccant wheel 9 about 854 kg/h $H_2O$ is adsorbed and thus removed from the air flow. Air from the desiccant wheel, the conduit 20, now contains about 480 kg/h $H_2O$. This corresponds to a water dew point of about 0° C. The adsorption of the $H_2O$ in the desiccant wheel is exothermic and the temperature of the air in the conduit 20 is about 33° C. This air is cooled to 15° C. in the cooler 16 and then forwarded via the conduit 52 to the desiccant wheel 14, section 22.

In the desiccant wheel 14 about 477 kg/h $H_2O$ is removed from the air. The remaining 3 kg/h flows with the air in the conduit 17. This corresponds to a water dew point of roughly −50° C. and the temperature is about 25° C. This air is cooled to −40° C. in the heat exchanger wheel 18 and further to −45° C. in the trim cooler 29. This trim cooler is operated by a not shown heat pump. Next, the air flows via the valve 31 to the $CO_2$ adsorbent bed 34 where virtually all $CO_2$, 80 kg/h, and virtually all $H_2O$, 3 kg/h, are adsorbed. The $CO_2$ and $H_2O$ depleted air next flows via the valve 37 and the conduit 33 to the heat exchange wheel 18 where it is heated to about 20° C.

This air flows in conduits 25 and 24, with no side draw in the conduit 21. One third of the air, about 10 kg/h, flows via the conduit 5 to the heater 6 where it is heated to about 90° C. Subsequently it flows via the conduit 7 to the desiccant wheel 14, regeneration section 13. The air exits the regeneration section 13 in the conduit 12 at a temperature of about 60° C. The $H_2O$ flow with the air is about 477 kg/h. The air is then re-heated to 90° C. in the heater 10 and enters the desiccant wheel 9, regeneration section 8 via the conduit 15. Downstream the regeneration, the conduit 4, the temperature has dropped to about 39° C. and the $H_2O$ flow with the air is about 1331 kg/h.

The table below shows a summary of the desiccant wheel operation. The stream numbers refer to FIG. 1, part 1. Silica gel is used as $H_2O$ adsorbent. The objective is to show that in the example, air entering and exiting the desiccant wheel regeneration sections has a lower amount of water adsorbed in the silica gel than the air entering and exiting the adsorption sections. Therefore, the regeneration air will regenerate the desiccant wheel adsorbent by removing water. In this process, the temperature of the air drops from the air inlet to the air outlet. As the table shows, when comparing streams 7 and 17, 12 and 52, 15 and 20 and 4 and 1, the equilibrium amount of $H_2O$ adsorbed in the desiccant wheel silica gel is lower into and out of regeneration sections than out of and into, respectively, $H_2O$ adsorption sections. People skilled in the art will however notice that the operation of the desiccant wheels is not optimized, especially with respect to the use of heat at the lowest possible temperature for adsorbent regeneration.

| Stream | Air flow kg/s | $H_2O$ flow kg/h | Temperature ° C. | Pressure H2O Pa | Adsorbed in silica gel at equilibrium moles/kg |
|---|---|---|---|---|---|
| 7 | 10 | <<3 | 90 | <<14 | <<0.06 |
| 17 | 30 | 3 | 25 | 5 | 0.28 |
| 12 | 10 | 477 | 61 | 2160 | 4.24 |
| 52 | 30 | 480 | 15 | 720 | 12.5 |
| 15 | 10 | 477 | 90 | 2160 | 1.45 |
| 20 | 30 | 480 | 33 | 720 | 6.22 |
| 4 | 10 | 1331 | 39 | 5700 | 17.5 |
| 1 | 30 | 1334 | 15 | 2020 | 23.6 |

Following operating mode one, operating mode 2 is initiated by adjusting the valve 31 such that there is free flow between the conduits 32 and 40, but no flow into the valve from the conduit 39. Instead, cold air may be bypassed via the valve 30 or the complete cold air supply may be stopped.

As indicated in FIG. 2, the $CO_2$ adsorbent will contain about 80 g $CO_2$ per kg adsorbent. After desorption of $CO_2$, with a $CO_2$ partial pressure of 1.0 bar and desorption temperature about 280° C., there will be a residual amount of about 15 g $CO_2$ per kg adsorbent. In this example, the net amount of $CO_2$ adsorbed will be 65 g per kg $CO_2$. People skilled in the art will understand that with lower partial pressure $CO_2$, such as if diluted by air, or higher desorption temperature such as up to 300° C., the residual amount of $CO_2$ in the adsorbent can be much lower.

Based on 65 g $CO_2$ per kg adsorbent, the adsorption and storage of 600 kg $CO_2$, about 9 metric tons of adsorbent is required. 10 metric tons will be assumed in this example, corresponding to about 12.5 m³ adsorbent beads. Furthermore, the volume of the 30 kg/s air flow at −45° C. is about 23.5 m³/s. With superficial air velocity of 0.6 m/s the total area of adsorbent becomes roughly 40 m²' Combined with the adsorbent volume of 12.5 m3, the thickness of the adsorbent bed is about 0.31 m.

The heating of 10 metric tons of adsorbent, heat will be supplied from the heat storage 54 to 58, stored in an earlier run, by flowing 30 kg/s gas from the heat storage 58 via the trim heater 41, through the adsorbent bed 34 where the gas gives off heat to the adsorbent and is cooled to the adsorbent temperature of near −45° C. such as shown in FIG. 3 part 2 graphs 61 and 61'. The cooled gas flows via the fan 43 to the cold end of the heat storage 54-58, cooling the cold end and thus preserving the low temperature and pushing more hot gas from the heat storage 58 to the adsorbent bed 34.

After completion of the $CO_2$ adsorbent heating, the third operating mode $CO_2$ desorption starts. $CO_2$ and air flow out of the $CO_2$ adsorbent 34 via the conduit 32, the valve 31, the conduit 40, the fan 43 which enforces the gas flow and then via the conduits 45 and 46 to the trim heater 41 where heat is supplied for the $CO_2$ and any $H_2O$ desorption. The warmed gas then flows via the conduit 42, the valve 37 and the conduit 36 to the adsorbent 34. This continues until the required amount of $CO_2$, 600 kg, is desorbed. The duration of this operation may in the order of one hour depending on the heat input in the heater 41 and the gas circulation rate.

Desorbed $CO_2$, about 600 kg, flows via the conduit 48, the valve 50 and the cooler 65 to the $CO_2$ storage 47.

After completion of the operating mode three, operating mode 4, $CO_2$ adsorbent cooling, starts. This is similar to the operating mode 2, but the air flowing between the heat storage 66 and the $CO_2$ adsorbent unit 35 now flows in the opposite direction, with cold gas flowing from the heat storage via the conduit 51 and downstream equipment to the $CO_2$ adsorbent 34. Here, the gas is heated by remaining heat from the $CO_2$ desorption. This warm gas flows via the conduit 36 to the heat storage 66, heating heat storage beds near the top by pushing a heat transfer zone towards the cold end of the heat storage. Simultaneously, cold gas from the cold end of the heat storage is pushed to the $CO_2$ adsorbent bed 34, further cooling this bed. When the adsorbent bed is cold throughout, the operating mode four is completed and the system is again ready to start with operating mode 1.

People skilled in the art will notice that the detail design of the air dehydration and cooling before $CO_2$ adsorption is dependent on ambient conditions. A cold environment and therefore low $H_2O$ content in the air may result in a much simpler system than shown in FIG. 1 part 1, for example one of the desiccant wheels may be omitted.

People skilled in the art will also notice that much energy can be saved by reducing the mean temperature difference in the heat exchanger wheel 18, and that a normal heat exchanger may be used instead. This reduces the amount of cooling needed in the trim heater 29.

In addition to this, people skilled in the art will understand that instead of zeolite adsorption beds for $CO_2$ and $H_2O$, potentially more efficient and less $H_2O$ sensitive $CO_2$ adsorption systems such as amine functionalized alumina may be used, but this may introduce the disadvantage of potential degradation of chemicals and production of toxic substances.

Furthermore, it will be understood that while the dehydration and cooling of the air may seem equipment and energy intensive, the current emphasis on low emission has forced and is forcing the development of extremely efficient air dehydration and cooling systems. The desiccant wheel is an example. Such systems have been and will continue to be adapted in order to simplify the air pre-treatment.

What is claimed is:

1. A method for capturing $CO_2$ from a $CO_2$ source including the steps of:
   a) conducting a stream of $CO_2$-containing gas through a bed of $CO_2$ adsorbent material capturing $CO_2$ from the streamed $CO_2$-containing gas in the $CO_2$ adsorbent bed,
   b) conducting a stream of heating gas through a heat storage and recovery unit comprising one or more beds of a storage material and said $CO_2$ adsorbent bed using a gas circulation pump, thereby transferring stored heat from said heat storage and recovery unit to said $CO_2$ adsorbent bed,
   c) circulating said heating gas by means of a fan the gas circulation pump in a closed loop from the $CO_2$ adsorbent bed through a trim heater and back through the $CO_2$ adsorbent bed, thereby desorbing $CO_2$ from the $CO_2$ adsorbent bed into the heating gas, and extracting heating gas comprising desorbed $CO_2$ from the closed loop,
   d) conducting a stream of cooling gas through the heat storage and recovery unit and the $CO_2$ adsorbent bed transferring heat from the $CO_2$ adsorbent bed to the heat storage and recovery unit.

2. The method according to claim 1, wherein in step a) the stream of $CO_2$-containing gas is conducted through the bed of $CO_2$ adsorbent material in a first direction, in step b) the stream of heating gas is conducted through the heat storage and recovery unit and said $CO_2$ adsorbent bed in a second direction opposite said first direction, and in step d) the stream of cooling gas is conducted through the heat storage and recovery unit and the $CO_2$ adsorbent bed in the first direction.

3. The method according to claim 1, wherein the stream of $CO_2$-containing gas is dried and cooled before being conducted to the $CO_2$ adsorbent bed.

4. The method according to claim 3, wherein the $CO_2$-containing gas is dried by being conducted through a first desiccant wheel and then cooled by being conducted through a heat exchanger before being conducted to the $CO_2$ adsorbent bed, and wherein $CO_2$-depleted gas, output from the $CO_2$ adsorbent bed, is returned through the heat exchanger and first desiccant wheel.

5. The method according to claim 3, wherein the $CO_2$-containing gas is dried by being conducted through a first desiccant wheel and then through second desiccant wheel and then being cooled by being conducted through a heat exchanger before being conducted to the $CO_2$ adsorbent bed, and wherein $CO_2$-depleted gas, output from the $CO_2$ adsorbent bed, is returned through the heat exchanger, first desiccant wheel and second desiccant wheel.

6. An arrangement for capturing $CO_2$ from a $CO_2$ source according to the method claimed in claim 1, the arrangement including:

a $CO_2$ capture container with the $CO_2$ adsorbent bed adapted to adsorb $CO_2$ during the adsorption step a. and desorb $CO_2$ during the desorption step c., wherein the arrangement further includes the heat storage and recovery unit comprising the one or more beds of the storage material adapted to transfer stored heat to the $CO_2$ adsorbent bed prior to the desorption step and recover heat from the $CO_2$ adsorbent bed after the desorption step, an inlet conduit connected to a first port of a first three-way valve, wherein an input line of the $CO_2$ capture container is connected to a second port of the first valve, an output line of said container is connected to a first port of a second three-way valve, a second port of said second three-way valve is connected to an outlet conduit, a third port of said first three-way valve is connected to a first port of a third three-way valve, a second port of the third three-way valve is connected to a first port of the heat storage and recovery unit, a second port of the heat storage and recovery unit is connected to a third port of the second three-way valve, a bypass conduit is connecting a third port of the third three-way valve to the second port of the heat storage and recovery unit, the arrangement further including the gas circulation pump installed either at the third port of the first three-way valve or at the third port of the second three-way valve, the trim heater installed at the third port of the second three-way valve, and a $CO_2$ outlet conduit with an outlet valve;

wherein the closed loop is formed at least in part by the third port of the first three-way valve, the gas circulation pump, the first port of the third three-way valve, the third port of the third three-way valve, the trim heater, the third port of the second three-way valve, the first port of the second three-way valve, the $CO_2$ capture container and the second port of the first three-way valve; and wherein the $CO_2$ outlet conduit is connected to the closed loop.

7. The arrangement according to claim 6, wherein the $CO_2$ adsorbent bed includes zeolite material.

8. The arrangement according to claim 6, wherein the heat storage and recovery unit includes several beds of a heat storage medium.

9. The arrangement according to claim 8, wherein the heat storage medium contains beads of a metallic or ceramic heat storage material.

10. The arrangement according to claim 6, wherein a gas intake conduit is connected to a drying input of a first desiccant wheel, a drying output of which is connected to a first side input of a heat exchanger, a first side output of which is connected to said inlet conduit, the outlet conduit is connected to a second side input of the heat exchanger, a second side output of the heat exchanger is connected to a gas outlet line, and wherein a recovery input of said first desiccant wheel is connected to gas outlet lines.

11. The arrangement according to claim 10, wherein a second desiccant wheel is installed between the first desiccant wheel and the heat exchanger.

12. The method according to claim 1, wherein the $CO_2$-containing gas is air or a flue gas.

13. The arrangement according to claim 9, wherein the beads have a diameter in the range 3-10 mm.

* * * * *